June 18, 1968 G. TOTTY 3,388,594
APPARATUS FOR MEASURING THE DRYING LENGTH OF COATING MATERIALS
Filed Nov. 9, 1966

INVENTOR
GORDON TOTTY
BY
*John L. Sipho*
ATTORNEY.

3,388,594
APPARATUS FOR MEASURING THE DRYING
LENGTH OF COATING MATERIALS
Gordon Totty, Lunenburg, Mass., assignor to The Borden
Company, New York, N.Y., a corporation of New
Jersey
Filed Nov. 9, 1966, Ser. No. 593,174
5 Claims. (Cl. 73—150)

ABSTRACT OF THE DISCLOSURE

The present invention relates to a liquid-holding power measuring apparatus for measuring the drying length of coating materials applied to moving substrates, such as paper or the like, and comprises an adjustably mounted arm which has at the free end thereof a rider member which engages the moving substrate which has been coated. The arm is maintained in engagement with the moving substrate and the distance between the portion where the liquid is applied to the substrate and the point where the rider member engages the substrate is measured and compared with the rate of movement of the substrate to calculate the drying length of the coating material.

---

Figure 1:
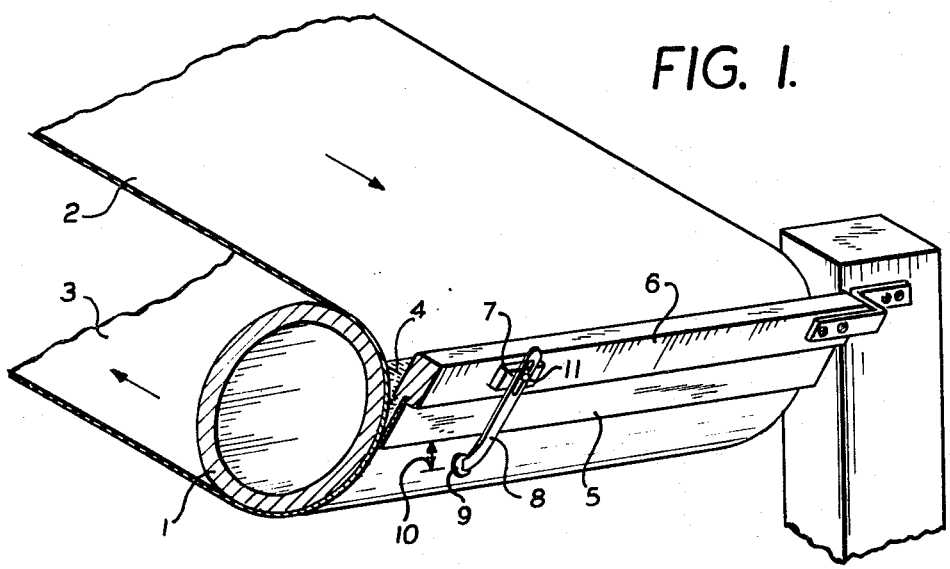

The common method of coating paper is by continuous addition of coating material from a coating pond onto a moving paper as shown in FIG. 1. In this operation it is important to know the drying time and rate, and liquid (usually water) holding power under the dynamic conditions of actual coating. In the past dynamic rates have not been available and testing was done by sampling edge portions of the paper and subjecting them to lengthy laboratory tests. Laboratory tests consisted essentially of the measurement of time for a coating to penetrate through a paper substrate.

The present invention provides an apparatus which offers immediate results with regard to liquid-holding power and drying times and rates of paper coating materials.

Briefly stated, the invention comprises an adjustable apparatus as hereinafter described and method for operating said apparatus.

Figure 2:
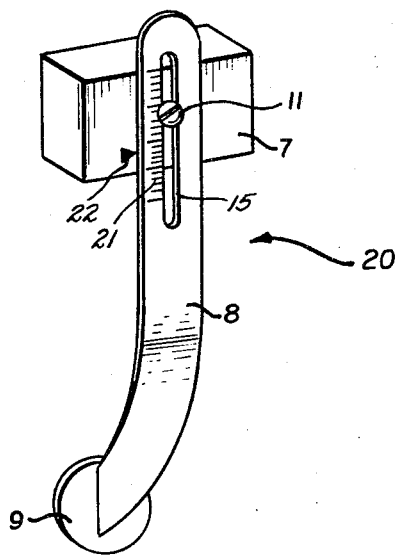
Figure 3:
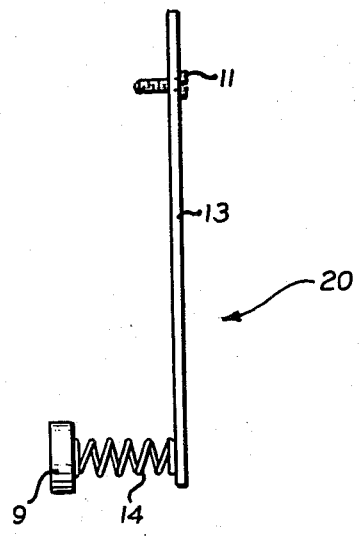

Referring to the figures, FIG. 1 represents in simplified broken isometric drawing of a continuous roll of paper being coated together with a testing apparatus in position. FIG. 2 is a representation of the apparatus. FIG. 3 is a plan side view of a variation of the apparatus.

Uncoated or previously coated dry paper 2 is pulled under tension (means not shown) around backing roll 1. Coating material 4 is maintained in a pool of said coating material and is applied to the moving paper through means of blade 5. The trowel holding the coating material is any of the usual types well-known in the paper coating industry. Blade 5 is maintained in position by blade holder 6. The coated paper 3 as shown, has passed around backing roll 1 and is continued for further processing or storage on a roll (not shown). Attached to blade holder 6 is testing apparatus collectively designated as numeral 20 in FIG. 2. The apparatus 20 substantially instantaneously measures the drying length of the substrate (in this case paper) and therefrom is readily calculated the drying rate of coating materials. It is observed that these measurements are readily made by the apparatus of this invention mounted in position as shown in FIG. 1 and in greater detail in FIG. 2. The testing apparatus comprises adjustably secured spring arm 8. Spring arm 8 is shown to be adjustably fastened to attachment base 7 by means of a screw 11 mounted in a slot 15. Flexible rider 9 is mounted onto spring arm 8 in a manner that causes rider 9 to maintain contact with coated paper 3 as it passes around backing roll 1. It will be noted that if the coating material is still wet at the point of contact of rider 9 and coated paper 3, a streak or mar will be registered on the coated surface. If the coating is dry, then no streaking or marring will be observed on the coated paper. The distance between the end of blade 5 and the median point of contact between the rider 9 and coated paper 3 is shown as gap distance 10.

The time for drying of the particluar coating composition is readily calculated by the simplified velocity equation by adjusting the gap distance to the point at which marring of the coated surface ceases for a particular coating composition, and knowledge of the speed at which the paper moves. The time so calculated is a measure of the drying characteristics and liquid or water-holding power of the coating under the dynamic conditions actual operation.

Modifications of the apparatus structure are apparent in that the adjusting screw shown could be substituted by other known replacements, as for example, clamps, adhesives, and the like. Further in order to insure contact of the rider and the coated paper, the spring arm can be mounted angularly toward the moving paper. In one modification of this apparatus (not shown) and in the interest of automation the spring arm can easily be constructed to stand away from the moving paper and be snapped into position against the moving paper by means of well-known spring mechanisms. In a further modification (not shown) a series of such apparatuses may be placed on blade holder 6 so that the riders, collectively referred to in this case as numeral 9 at different known gap distances from the end of blade 5. By snapping all of the spring arms against the moving paper (or individually) the precise point of drying will be immediately noted without the necessity for adjusting gap distance as in the case of only one such testing apparatus.

In another modification rider 9 may be attached to arm 13 by means of spring 14 which tends to maintain tension on the moving coated paper. The modification is shown in FIG. 3 wherein arm 13 has adjusting screw 11 for mounting on an attachment base (not shown) and spring 14 attached by any usual means to arm 13 and having connected to the other end thereof rider 9. The connections can be made by any known method such as adhesive, clamps, staples, etc. In this modification arm 13 is maintained at the proper angle to insure that spring 14, in tension, causes rider 9 to contact moving coated paper 3.

As to materials, the spring arm may be usual spring steel, or even wood where a spring action is not required. The rider material may be any suitable soft material which will not rip or tear the moving coated paper. Examples of suitable materials are soft rubber, sponge rubber, soft synthetics such as butyl rubber, neoprene, Teflon, cotton, and other soft textiles, and the like. The rider should be preferably non-absorbent in order to prevent caking of the coating material in the rider. If an absorbent material is used, it should be replaced frequently in order to prevent caking therein.

As another modification of this invention, the arm is calibrated in units of length so as to provide immediate drying length measurements. In the embodiment of FIGURE 2, there is illustrated a scale 21 used for length measurements and a reference point 22 adjacent said scale on attachment base 7 whereby the gaps 10 shown in FIGURE 1 may be shortened or lengthened in accordance with the units of measure on the scale. A sliding marker attachment, well-known in the art, can be readily affixed to the arm to align the blade edge and the distance units. In the absence of a sliding attachment the distance may be easily approximated by the operator. In this modification, it is important to note that any curvature in the arm must be taken into consideration when making the length measurements.

It is understood that it is intended to cover all changes and modifications of the drawing of the invention herein chosen for the purpose of illustration which do not constitute departures from the spirit and scope of the invention.

I claim:

1. A liquid holding power measuring apparatus for measuring the drying length of coating materials applied to moving substrates comprising an arm, means for adjustably mounting said arm for movement at one end thereof, a rider member, biasing means interposed between the free end of said arm and said rider member whereby said rider is maintained in engagement with said moving substrate.

2. The apparatus of claim 1 wherein said rider member is provided with a material having a low coefficient of friction at the point of engagement with said substrate.

3. The apparatus of claim 1 wherein said biasing means is a spring.

4. The apparatus of claim 1 wherein said arm has length units calibrated thereon adjacent the adjustable mounting means.

5. In combination, a continuous ribbon of a fibrous substrate, a cylindrical backing roll, means mounting said backing roll for rotation, said continuous ribbon of fibrous substrate being entrained about said backing roll under tension and adapted for continuous advancement thereabout as said backing roll is rotated, a blade holder parallelly disposed with respect to said backing member and rigidly mounted in close relationship thereto, a trowel blade mounted along the edge of said blade holder and angularly disposed with respect to a vertical plane through the axis of said backing roll whereby the edge of said blade contacts the moving substrate as same is advanced about the circumferential face of said cylindrical backing roll, a pool of coating material retained above the contact edge of said blade whereby said blade serves to coat the moving fibrous substrate with a thin layer of coating material, an elongated arm having a slot at one end thereof, said slot having length units calibrated adjacent thereto, an adjustment base mounted on said blade holder adapted to receive a screw passed through said calibrated slot in said arm whereby said arm is adjustably mounted on said blade holder, said arm having at the free end thereof a rider member connected to said free end by a spring, said spring maintaining said rider member in contact with said coated substrate.

References Cited

UNITED STATES PATENTS

| 2,280,483 | 4/1942 | Gardner | 73—150 |
| 2,301,733 | 11/1942 | McGovern | 73—150 |
| 2,488,869 | 11/1949 | Keenan et al. | 73—150 |

FOREIGN PATENTS 658,102  10/1951  Great Britain.

DAVID SCHONBERG, *Primary Examiner.*

LOUIS R. PRINCE, *Examiner.*

J. NOLTON, *Assistant Examiner.*